(12) United States Patent
Parker

(10) Patent No.: US 8,569,971 B2
(45) Date of Patent: Oct. 29, 2013

(54) NIGHT LIGHT

(76) Inventor: Steven Parker, Surrey (GB)

( * ) Notice: Subject to any disclaimer, the term of this patent is extended or adjusted under 35 U.S.C. 154(b) by 571 days.

(21) Appl. No.: 12/065,494

(22) PCT Filed: Aug. 30, 2006

(86) PCT No.: PCT/GB2006/003216
§ 371 (c)(1),
(2), (4) Date: Feb. 29, 2008

(87) PCT Pub. No.: WO2007/026147
PCT Pub. Date: Mar. 8, 2007

(65) Prior Publication Data
US 2008/0224637 A1   Sep. 18, 2008

(30) Foreign Application Priority Data

Aug. 31, 2005  (GB) .................................. 0517729.0

(51) Int. Cl.
*H05B 37/02*  (2006.01)
(52) U.S. Cl.
USPC ........................................... 315/307; 315/308
(58) Field of Classification Search
USPC .......... 315/224, 225, 291, 307, 308, 312, 318
See application file for complete search history.

(56) References Cited

U.S. PATENT DOCUMENTS

| | | | |
|---|---|---|---|
| 3,797,012 A * | 3/1974 | Gibbs et al. | ............. 340/815.56 |
| 5,926,440 A | 7/1999 | Chien | |
| 6,285,140 B1 | 9/2001 | Ruxton | |
| 6,480,112 B1 | 11/2002 | Ball | |
| 6,726,112 B1 * | 4/2004 | Ho | ................................. 236/94 |
| 2002/0017997 A1 | 2/2002 | Felkowitz | |
| 2004/0032749 A1 | 2/2004 | Schindler et al. | |
| 2004/0160769 A1 | 8/2004 | Currie et al. | |
| 2006/0168733 A1* | 8/2006 | Straub | ............................... 5/655 |

FOREIGN PATENT DOCUMENTS

| | | |
|---|---|---|
| AU | 79477/82 | 1/1982 |
| DE | 29611262 U1 | 10/1996 |
| DE | 29706703 U1 | 8/1997 |
| DE | 202005001742 U1 | 7/2005 |
| EP | 0056104 A1 | 7/1982 |
| FR | 2814801 | 4/2002 |
| GB | 2342747 A | 4/2000 |
| JP | 2004240378 | 8/2004 |
| WO | 03 048821 A1 | 6/2003 |
| WO | 2004 071935 A2 | 8/2004 |
| WO | WO 2004071935 A2 * | 8/2004 |

* cited by examiner

*Primary Examiner* — Jimmy Vu
(74) *Attorney, Agent, or Firm* — Lowe Graham Jones PLLC

(57) ABSTRACT

A night-light (100) having a light source (104) and control circuitry (110), which is arranged to receive a temperature input comprising a measure of temperature measured by a temperature sensor (208). The light source (104) is arranged to emit light in a first color when the temperature measured by a temperature sensor (208) is within a predetermined range and to emit light in an alternative color when the temperature measured by the temperature sensor (208) is outside the predetermined range. The night-light may be of particular use in babies' nurseries.

24 Claims, 4 Drawing Sheets

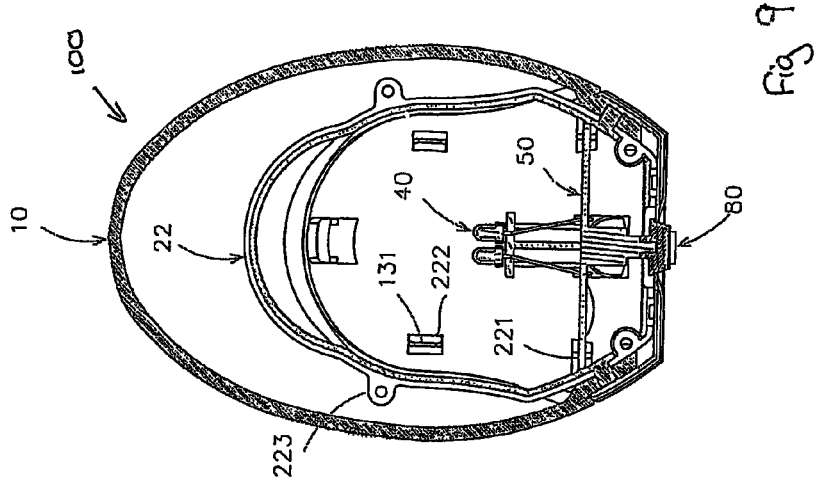
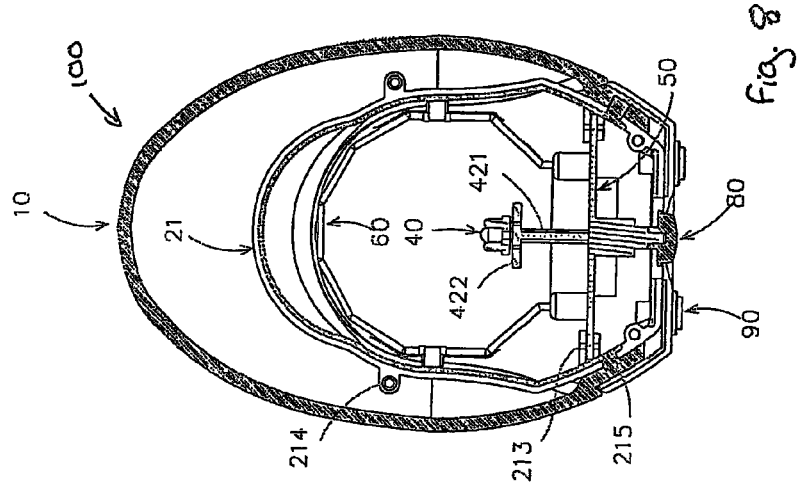
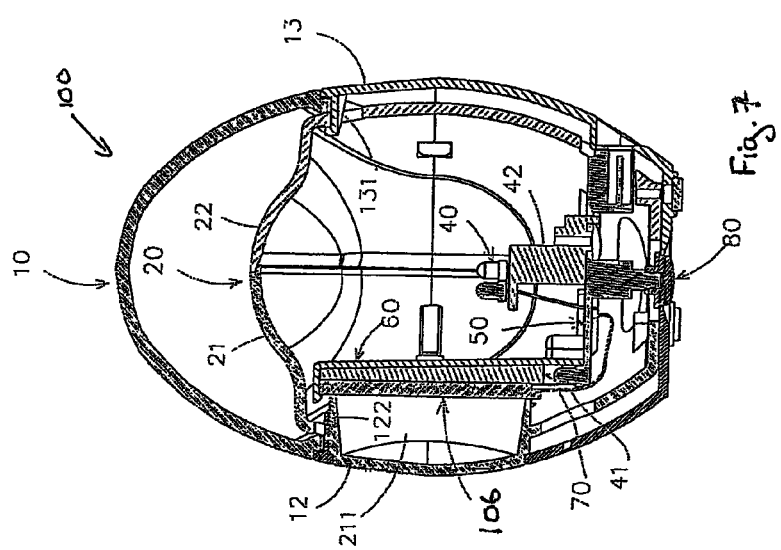

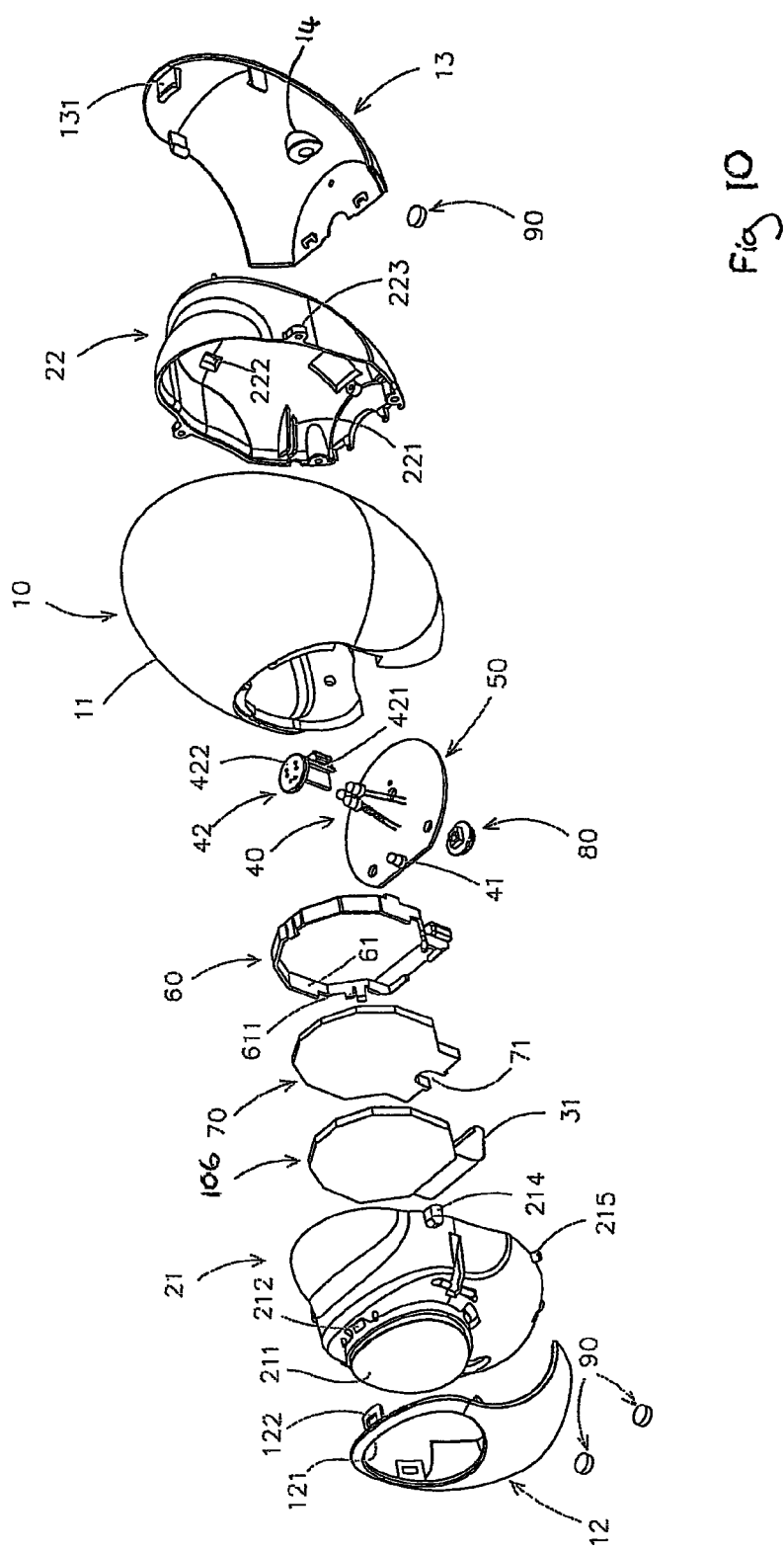

NIGHT LIGHT

This application is a filing under 35 U.S.C. §371 of PCT/GB2006/02316, which claims priority from GB Application Ser. No. 0517729.0 filed 31 Aug. 2005.

This invention relates to night-lights, and in particular but not exclusively to night-lights for nurseries.

Children's nurseries, which are usually small rooms, tend to be cluttered with toys, night-lights, baby changing paraphernalia and the like. Carers often use monitoring equipment to ensure the safety of their child, including intercom devices, so that carers hear when the baby wakes up, breathing monitors and, following contemporary advise, room thermometers. This is because studies have linked Sudden Infant Death Syndrome (SIDS or cot death) with room temperature. These studies have shown that there is a desirable temperature range of 16 to 20° C. with the provision of some bedding, although this is contrary to the instincts of many carers, who will feel that the temperature is too low and will be tempted to add extra blankets to the baby's bed to ensure he/she is not too cold. Even once a carer knows the temperature, he or she must be educated in what to do with the temperature information in order to best protect their baby from the risk of SIDS.

Often, in order to read a thermometer, ambient light is required which may wake a baby. Given that and the clutter of a nursery, the carer is not provided with a clear, immediate and ambiguous indication of their baby's safety on entering the nursery.

According to a first aspect of the invention, there is provided a night-light comprising a light source and control circuitry arranged to receive a temperature input comprising a measure of temperature measured by a temperature sensor and to control the light source, the light source being arranged to emit light of a first colour when the temperature input is within a predetermined range and to emit light of at least one alternative colour when the temperature input is outside the predetermined range.

This is advantageous as known room thermometers generally comprise some form of readout, which may be analogue (reading a level of mercury, for example) or, perhaps more commonly, digital, but tend to be hard to read in low ambient light levels. Night-lights have previously been aesthetic objects but the functionality can be advantageously increased as follows. By providing a night-light which measures temperatures and provides an easily readable indication of when the temperature is within a predetermined range corresponding to the range in which the risk of SIDS is minimised, a carer can monitor the temperature without the need to turn on a light which may disturb the baby. Further, the night-light is likely to be visible from a distance and therefore it may not be necessary for the carer to approach the device to determine whether the baby is a risk due to the temperature of the room. Action can then be taken in response to the temperature.

The night-light may be arranged to emit light of colours which have an intrinsic meaning to an observer. Preferably, the meaning is associated with hot/cold. For example, blue tends to be associated with cold and red with hot. This is advantageous, as a person unfamiliar with the night-light will instinctively understand whether the room is too hot or too cold.

In some embodiments, there is provided a temperature sensor arranged to provide the temperature input and arranged to affix to the exterior of the night-light. This is advantageous as the night-light or its components may be a source of heat and therefore a temperature sensor included therein may not accurately measure the temperature of the room, but instead the elevated temperature within the night-light.

Preferably, the night-light comprises at least one secondary temperature indicator arranged to indicate whether the temperature input is within the predetermined range.

Preferably, the or each secondary temperature indicator comprises one or more of the following: a display means arranged to display a symbol, a colour, a light, a coloured light, textual instructions, temperature information; an alarm means or the like.

This may be advantageous as one indication of temperature may be more readily understood by a carer than another form of indication. For example, a colour-blind carer may not be alerted by a change in colour of the light emitted by the night-light. However, if a symbol is also displayed, the carer will be able to react.

In embodiments where the secondary temperature indicator means is arranged to display one or more symbols, the symbols preferably have an intrinsic meaning to an observer. Preferably, the meaning is negative or positive. For example, a representation of a smiley face has the intrinsic meaning of 'good', where as a 'frowning' face, with a down-turned mouth, has the meaning of 'bad'. Other examples include ticks and crosses, thumbs up and thumbs down, and the like. This is advantageous as a person unfamiliar with the night-light will instinctively understand when a recommended action need be taken. This is particularly advantageous as the baby may, for example, be cared for by a babysitter, who may not have been educated in the meaning of the colour of light emitted by the night-light.

Preferably, the night-light is arranged emit light of at least three colours, a first colour when the temperature input is within the predetermined range, a second colour when the temperature input is below that range and a third colour when the temperature input is above that range.

The predetermined range is preferably between roughly 16° C. and roughly 20° C. These temperatures are consistent with contemporary research into the room temperature which provides the lowest risk of SIDS.

In some embodiments, the night-light may be arranged to emit light of four colours, a first colour when the temperature input is within the predetermined range, a second colour to indicate that the temperature input is below the predetermined range, a third colour when the temperature input is above that range, but not dangerously so, and a fourth colour to indicate that the temperature dangerously exceeds the predetermined range. This is advantageous as it allows a carer to react appropriately to a given temperature.

Preferably, the third colour is used when the temperature is above 20° C. Preferably, the fourth colour is used when the temperature is above 24° C. These temperatures are consistent with research showing that, at below 16° C. or above 24° C., a baby is at significantly higher risk of SIDS. The ideal room temperature for a nursery is believed to be 16 to 20° C., although a baby may safely sleep in temperatures of 20 to 24° C. provided light bedding is used.

These ranges relate to a preferred embodiment but it will be appreciated that they may change given further studies on the effect of temperature on the risk of SIDS. Further, it may be that the recommended action could be associated with smaller ranges to give carers more detailed information about how to maintain their baby's temperature at a desired level.

Preferably the night-light is provided with an instruction set, linking the colour of the light to a recommended action. This is advantageous as it provides a source of information so that the parent will react correctly.

The recommended actions may relate to the provision of sleepwear, preferably sleepwear for a baby. This is advantageous as there has been shown to be a link between the temperature of a baby and the risk of SIDS. Therefore, following recommended actions to provide the required level of warmth through sleepwear reduces the risk to the baby. It will be appreciated that the term 'sleepwear' is intended to cover both the baby's clothing and bedding such as sheets, blankets and the like and further that there may be a 'trade off' between the temperature of the room.

The recommended actions may include one or more of the following: cool room, heat room, use light sleepwear, use moderate sleepwear, use heavy sleepwear, use an alternative room, or the like.

According to a second aspect of the invention, there is provided a kit comprising a night-light according to the first aspect of the invention and a temperature sensor arranged to provide the temperature input.

It is advantageous to provide the temperature sensor external to the night-light as the night-light or its components may be a source of heat and therefore a temperature sensor included therein may not accurately measure the temperature of the room, but instead the elevated temperature within the night-light.

In one embodiment, there is provided a power supply means arranged to supply power to the night-light, the power supply means comprising the temperature sensor. This is advantageous as a power supply means will supply the night-light with power and, by incorporating the temperature sensor therein, the components external to the night-light are minimised.

The kit may further comprise a set of instructions providing details of the action recommended given the temperature of a room as indicated by the colour of the light.

The set of instructions may provide a sleepwear guide which can be used by a carer to select sleepwear for the baby with an appropriate level of thermal resistance.

The set of instructions may comprise information printed on the thermometer and/or supplied in an instruction book, manual or the like.

Bedding is usually rated on the 'Tog' scale, which is a measure of thermal resistance. The set of instructions may define the correct level of sleepwear with reference to the Tog value. This is convenient as blankets, duvets and the like, and some clothes, are often labelled with Tog values and therefore the carer will be able to easily identify the level of sleepwear.

The kit may further comprise sleepwear of known thermal resistance. This is convenient as the carer then knows what sleepwear is required and has it to hand.

The set of instructions may further comprise information on how to site the night-light. This is advantageous, as a poorly cited thermometer (e.g. above a radiator, by an open window) may not provide an accurate measurement of room temperature or, more crucially, the temperature around a baby.

An embodiment of the invention is now described, by way of example only, with reference to the accompanying figures of which:

FIGS. 7 to 9 show cross-sections of a night-light according to one embodiment of the present invention; and FIG. 10 shows an exploded view of the components of the night-light of FIGS. 7 to 9.

Figure 1:
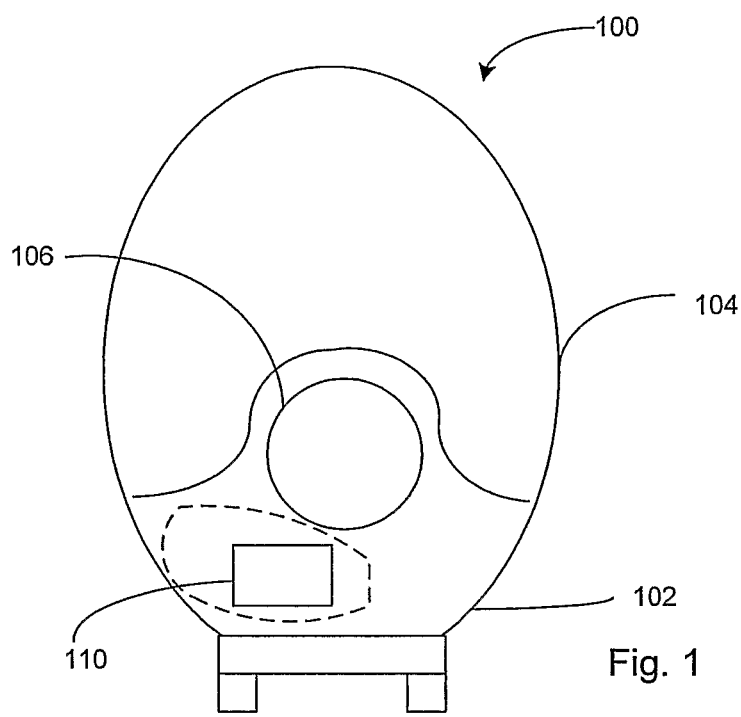
FIG. 1 shows a front view of a night-light according to one embodiment of the present invention.

FIG. 1 shows a night-light 100, in this example arranged to monitor the temperature of a baby's nursery, comprising a housing 102 in which is mounted a light source, in this case an enclosed lamp 104. The housing 102 further comprises a display panel 106.

The display panel 106 is an LCD display and is arranged to display the temperature measured by a temperature sensor 208 described hereinafter. An area of the display panel 106 is arranged to display a representation of a face (shown in FIGS. 3 to 6) according to the temperature measured by the temperature sensor 208. The display panel is illuminated with light from the lamp 104. In this embodiment, the lamp 104 is provided with coloured Light Emitting Diodes (LEDs) in blue, white, orange and red, each of which may be switched on or off by the control circuitry 110.

The housing 102 is made of substantially opaque plastic while the lamp 104 is covered in a 'frosted' translucent plastic dome 11. As is understood to one of ordinary skill in the art upon viewing FIG. 10, the lens 11 is removeably attached to the housing 102 and the lens 11 is configured to diffuse light generated by a light source.

Figure 2:
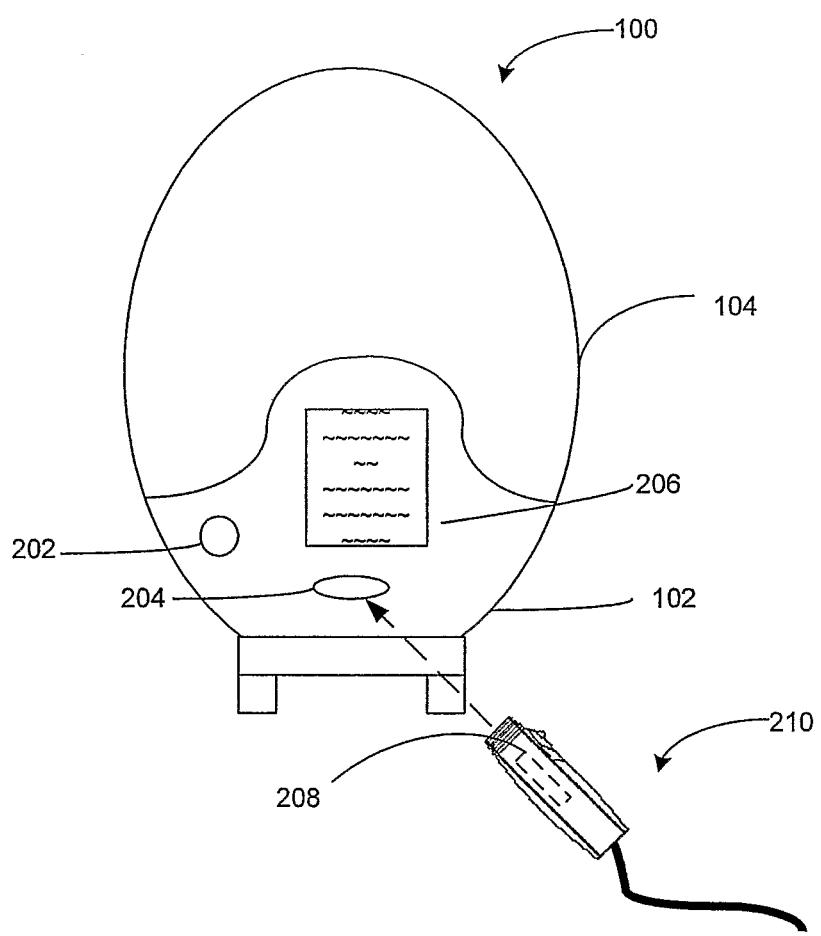
FIG. 2 shows a back view of the night-light of FIG. 1.
Figure 3:
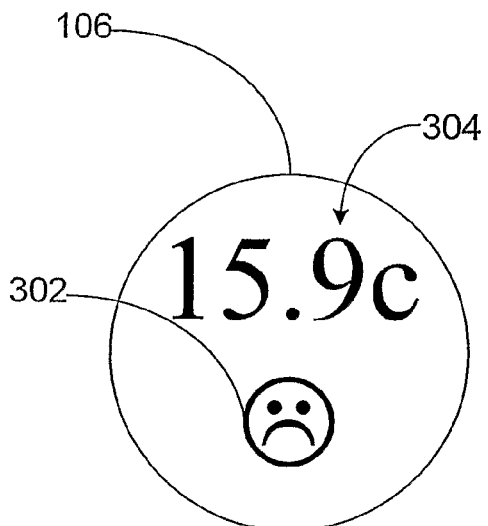
FIGS. 3 to 6 show details of the display panel of the night-light.
Figure 4:
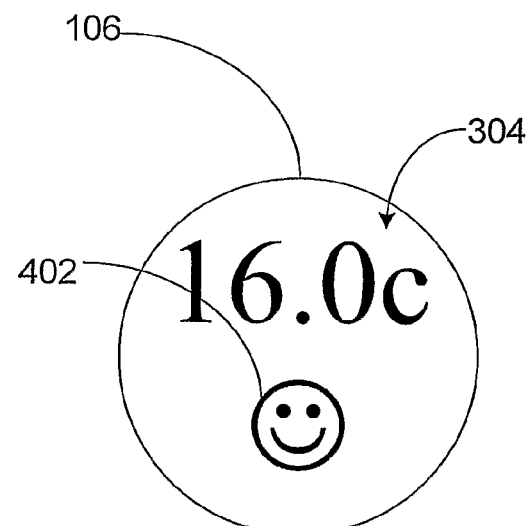
Figure 5:
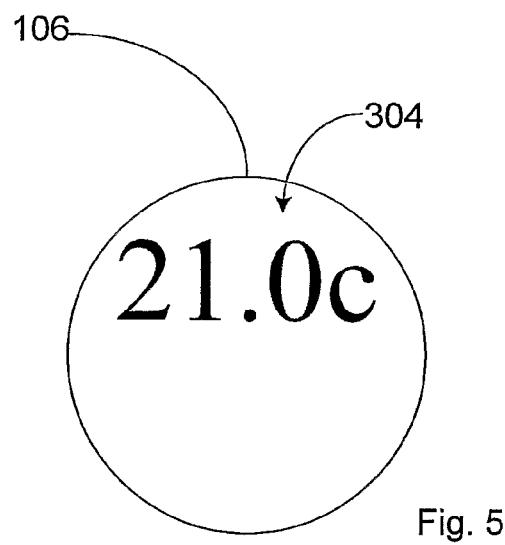
Figure 6:
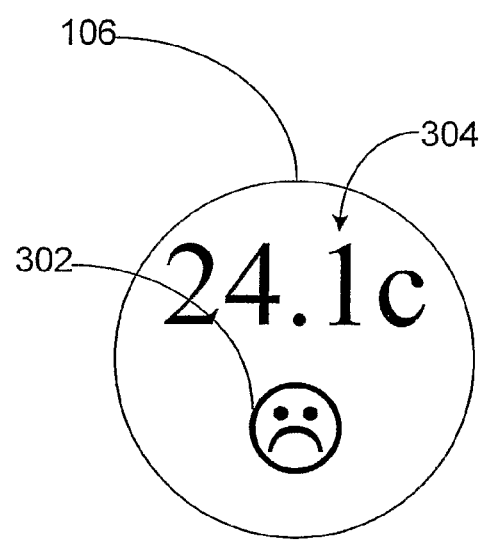

The night-light 100 further comprises, as shown in FIG. 2, an on/off switch 202, a power input point 204 and an instruction set 206. There is further provided a power cable 210 which provides a power supply means and comprises a USB connection means which is arranged to be received by the power input point and incorporates the temperature sensor 208.

The control circuitry 110 is arranged to receive inputs from the temperature sensor 208 and to control the lamp 104 and the display of the display panel 106 according to the inputs.

In use of the night-light 100, the power cable 210 is connected to the power input point 204 and the on/off switch 202 is switched to turn the night-light 100 on. The display panel 106 is arranged to display temperature information 304 along with an indication of the recommended action a carer should take to minimise the risk of SIDS from over- or under-heating a baby sleeping in the room as explained in greater detail below.

The lamp 104 is arranged to emit light in a colour corresponding to the measured temperature. The display panel 106 is also illuminated in this colour. When the temperature is measured at below 16° C., the blue LED is lit and the lamp 104 therefore emits blue light. When the temperature is measured as between 16° C. and 20° C., the white LED is lit and the lamp 104 emits white light. When the temperature is measured as between 20° C. and 24° C., the orange LED is lit and the lamp 104 lamp emits orange light. Finally, when the temperature is measured at above 24° C., the red LED is lit and the lamp 104 emits red light.

Therefore, a white light indicates that a 'normal' level of sleepwear is required, an orange light indicates that the room is warm and therefore a carer should select lighter sleepwear. A blue or red light indicates that the carer should make an effort to heat or cool the room, or else find an alternative place for their baby to sleep as the baby is at increased risk of SIDS in such an environment. The instruction set 206 could give details on what a 'normal' level is, although in this embodiment, the information is given in an instruction book.

When the temperature is measured at below 16° C., the display panel 106 is controlled by the control circuitry 110 to display a frowning face 302. When the temperature is measured as between 16° C. and 20° C., the display panel 106 is controlled to display a smiley face 402. When the temperature is measured as between 20° C. and 24° C., no face is displayed and when the temperature is measured at above 24° C., the display panel 106 is controlled to display a frowning face 302. The display panel therefore provides a secondary temperature indication means.

The instruction set 206 gives advice on how the carer should respond to the temperature. The smiley face 402 and a white light indicates that a 'normal' level of clothes and bedding is required as sleepwear. When no face is displayed and the lamp is orange, this indicates that the room is warm and therefore a carer should select lighter nightwear/bedding. A frowning face 402 and a blue or red light indicates that the carer should use very heavy or very light sleepwear, make an effort to cool or heat the room, or else find an alternative place for their baby to sleep as the baby is at increased risk of SIDS in such an environment The lamp 104 provides low level lighting which a baby is likely to find reassuring, but which will not prevent the baby from sleeping. The frosted dome with which the lamp 104 is covered provides soft, diffused light as suited to this purpose.

An embodiment with an alternative arrangement of components is shown in detail in FIGS. 7 to 10. Parts in common with the embodiment described above are labelled with like numbers.

In this embodiment, the night-light 100 comprises an enclosure 10 for the lamp 104 with an inner casing 20, an LCD display panel 106, a lamp 104 comprising a plurality of LEDs 40, 41, a circuit board 50, a light-guiding panel 60, and a power switch 80.

The night-light 100 of this embodiment comprises a translucent egg-shaped enclosure body 10 made of plastic, a front cover 12 and a rear cover 13, which are located on the front and rear sides of the enclosure body 10. The front 12 and rear covers 13 form part of the egg-shaped enclosure 10. An LCD opening 121 and vent 123 are provided on the front cover 12; and a plurality of connecting pins 22 are provided on the edge of the front cover 12 to engage with an inner casing 20, described hereinafter. The lower section of the front cover 12 is flat to accommodate the LCD display panel 106. Resilient connecting pins 131 are provided on the inner side close to the edge of the rear cover 13 to engage with inner casing 20. The front 12 and rear covers 13 are respectively connected with the front and rear sides of the enclosure body 10 and are fixed to the inner casing 20 using screws.

The inner casing 20 is made of clear plastic. A forward-protruding LCD screen cover 211 is provided on the front section of a front inner casing 21. The LCD screen cover 211 is located in an LCD opening 121 on the front cover 12. A plurality of receiving means 212 corresponding to connecting pins 122 on the front cover 12 are provided on the outer side of the LCD screen cover 211 in the front inner casing. Circuit board holders 213 and 221 are provided in front inner casing 21 and the rear inner casing 22. The circuit board holders 213 and 221 comprise fixing lugs 214 and 223 on the outer edge and are flat at the bottom. On the rear wall in the rear inner casing 22 is a connecting hole 222 corresponding to the connecting pins 131 on the rear cover 13. The front 21 and rear 22 inner casings connect at the fixing lugs 214 and 223 using screws. The front inner casing 21 and front cover 12 engage with the receiving means 212 on front inner casing 21 through connecting pins 122 on front cover 12. The rear inner casing 22 and rear cover 13 engage with the connecting hole 222 on the rear inner casing 22 through connecting sheets 131 on rear cover 13. The front inner casing 21 and rear inner casing 22 are fixed to enclosure 10 via fixing columns 215 at their bases.

An LCD display panel 106 is provided at the front section of the egg-shaped enclosure 10 and is located on the front side of a light-guiding panel 60. It is supported by spring clips 611 protruding from the lateral edge of the light-guiding panel 60. A connecting wire 31 is provided at the bottom of the LCD display 104 to connect to the circuit board 50; the LCD display panel 106 is connected with the circuit board 50 through the connecting wire 31.

To display light of different colours, a plurality of diodes 40, 41 are provided in inner casing 20. There are eight diodes in total in the present embodiment. These diodes give off light of blue, yellow, orange and red, each diode giving off light with specific temperature limits. Four of the diodes 40, one of each colour, are located in a diode holder 42 at the central section of the inner casing 20. The diode holder 42 comprises a vertical panel 421 and circular fixing pin 422 connected at the upper section; diode leg holes are provided on fixing pin 422. The legs of the four diodes 40 are connected with circuit board 50 through leg holes on the fixing pin 422. The other four diodes 41 are located on the front edge of circuit board 50.

The circuit board 50 is fixed by clip-shaped circuit board holders 213 and 221 on front inner casing 21 and rear inner casing 22. The diode holder 42 is fixed on circuit board 50. The four diodes 41 provided on the front edge of diode holder 42 provide a light source for light-guiding panel 60. The circuit board 50 comprises control circuits that switch on different diodes corresponding to different temperature.

The control circuit comprises an integrated circuit chip, arranged to provide a temperature control chip, and peripheral circuits. The temperature control chip in the present embodiment is a C2127B temperature control chip and is interconnected with a temperature sensor 208, the diodes 40 and the LCD display panel 106. The LCD display panel 106 displays the real-time temperature detected by the temperature sensor 208 and processed by the temperature control chip.

The peripheral circuits for control circuit comprises triodes, resistors and capacitors. Four sets of triode and resistor pairs are connected to individual pins of the temperature control chip and to a diode 40 of a particular colour.

The light-guiding panel 60 is provided on the front section of diodes 40. The light-guiding panel 60 is circular or polygonal clear plastic panel corresponding to LCD display panel 106 in dimension and at its bottom are grooves 62 for accommodating the four diodes 41 located at the front edge of the circuit board 50. The light-guiding panel 60 is connected by screws to the rear cover 13 through screw holes 132 on the rear cover 13. Light from the diodes 41 located at the front edge of the circuit board 50 is guided upward by the light-guiding panel 60.

The power switch 80 is located at the bottom of the enclosure 10 and is a prior art button-type switch. The power switch 80 is connected with the circuit board 50 at its upper section.

Four rubber feet 90 are attached to the bottom sections of the enclosure 10.

Temperature detection for the thermometer in the present invention is realised by temperature a sensor 208. As shown in FIG. 10, a power port 14 is provided on enclosure 10. The power port 14 in the present embodiment is USB port connected with the circuit board 50, and a power plug is plugged in power port 14. A prior art temperature sensor 208 is mounted on the USB power plug and connected with circuit board 50 through power plug 70 to transmit detected indoor temperature to control circuit 90 for further processing.

Alternative embodiments exist which do not depart from the scope of the invention. As will be appreciated, the temperature ranges given, while corresponding to present medical advice, are examples only. The ranges could be different or smaller, perhaps providing more than four states of recommended actions. The night-light 100 could be battery operated or arranged to carry out further functions. These may include operating as a 'mobile', an alarm clock, a baby monitor, or the like. It will be appreciated that the figures represent only two arrangement of the components. The temperature sensor could be incorporated within the night-light 100 components could be differently positioned within the night-light 100, and so on.

The invention claimed is:

1. A nursery night-light comprising:
   a housing;
   a light source being located within the housing;
   a frosted dome being attached to the housing, the dome configured to diffuse light generated by the light source;
   control circuitry arranged to receive a temperature input comprising a measure of temperature measured by a temperature sensor and to control the light source, the light source being arranged to emit light of a first colour when the temperature input is within a predetermined range and to emit light of at least one alternative colour when the temperature input is outside the predetermined range; and
   at least one secondary temperature indicator arranged to indicate whether the temperature input is within the predetermined range, the at least one secondary temperature indicator is additional to the light source,
   wherein the at least one secondary temperature indicator is located on the housing such that a viewer visualizes without looking through the dome.

2. The night-light according to claim 1, further comprising a temperature sensor arranged to provide the temperature input and arranged to affix to the exterior of the night-light.

3. The night-light according to claim 1, wherein the color of the emitted light has an intrinsic meaning to an observer.

4. The night-light according to claim 3, wherein the intrinsic meaning is associated with one of hot or cold.

5. The night-light according to claim 1, wherein the at least one secondary temperature indicator comprises one or more of the following: a display means arranged to display a symbol, a colour, a light, a coloured light, textual instructions, temperature information; an alarm means.

6. The night-light according to claim 1, wherein the secondary temperature indicator means has an intrinsic meaning to an observer.

7. The night-light according to claim 1, wherein the light source is arranged to emit light of at least three colours, a first colour when the temperature input is within the predetermined range, a second colour when the temperature input is below that range and a third colour when the temperature input is above that range.

8. The night-light according to claim 7, wherein the predetermined range is between roughly 16° C. and roughly 20° C.

9. The night-light according to claim 1, wherein the light source is arranged to emit light of four colours, a first colour when the temperature input is within the predetermined range, a second colour to indicate that the temperature input is below the predetermined range, a third colour when the temperature input is above that range, but not substantially so, and a fourth colour to indicate that the temperature input dangerous exceeds the predetermined range.

10. The night-light according to claim 9, wherein the third colour is used when the temperature input is above 20° C.

11. The night-light according to claim 10, wherein the fourth colour is used when the temperature input is above 24° C.

12. The night-light according to claim 1, further comprising an instruction set, linking the colour of the light to a recommended action.

13. The night-light according to claim 12, wherein the recommended actions relate to the provision of sleepwear.

14. The night-light according to claim 12, wherein the recommended actions include one or more of the following: cool room, heat room, use light sleepwear, use moderate sleepwear, use heavy sleepwear, use an alternative room.

15. The night-light according to claim 1, further comprising a kit.

16. The night-light according to claim 15, wherein the kit further comprises a power supply means arranged to supply power to the night-light, the power supply means comprising the temperature sensor.

17. The night-light according to claim 16, wherein the kit further comprises a set of instructions providing details of the action recommended given the temperature of a room as indicated by the colour of the light.

18. The night-light according to claim 17, wherein the set of instructions provides a sleepwear guide which can be used by a carer to select sleepwear for a baby with an appropriate level of thermal resistance.

19. The night-light according to claim 18, wherein the set of instructions defines the correct level of sleepwear with reference to the Tog value.

20. The night-light according to claim 17, wherein the set of instructions comprises information printed on one of the night light or in an instruction manual.

21. The night-light according to claim 20, wherein the kit further comprises sleepwear of known thermal resistance.

22. The night-light according to claim 15, wherein the set of instructions further comprises information on how to site the night-light.

23. The night-light according to claim lwherein the at least one secondary temperature indicator comprises a display means arranged to display a symbol.

24. A nursery night-light comprising:
   a light source;
   control circuitry arranged to receive a temperature input comprising a measure of temperature measured by a temperature sensor and to control the light source, the light source being arranged to emit light of a first color when the temperature input is within a predetermined range and to emit light of at least one alternative color when the temperature input is outside the predetermined range;
   at least one secondary temperature indicator arranged to indicate whether the temperature input is within the predetermined range; and
   a housing,
   wherein the at least one secondary temperature indicator is located on the housing.

* * * * *